United States Patent [19]
Lloyd

[11] 3,951,510
[45] Apr. 20, 1976

[54] INERTIALLY STABILIZED HELIOSTAT ASSEMBLY

[75] Inventor: Wayne B. Lloyd, Baltimore, Md.

[73] Assignee: Westinghouse Electric Corporation, Pittsburgh, Pa.

[22] Filed: Feb. 25, 1975

[21] Appl. No.: 553,049

[52] U.S. Cl. .................................. 350/16; 353/3
[51] Int. Cl.² ...................................... G02B 23/00
[58] Field of Search ............... 350/16, 6, 285, 289, 350/26; 353/3; 356/248, 253, 255, 149; 250/203 R, 234; 343/761; 248/485, 486; 126/270, 271

[56] References Cited
UNITED STATES PATENTS

| | | | |
|---|---|---|---|
| 1,976,428 | 10/1934 | Arthuys et al. | 353/3 |
| 3,446,980 | 5/1969 | Meier | 350/16 |
| 3,518,016 | 6/1970 | Burdin et al. | 350/16 |
| 3,552,216 | 1/1971 | Pasquet | 350/16 |
| 3,612,643 | 10/1971 | Weber | 350/16 |

Primary Examiner—John K. Corbin
Assistant Examiner—Jon W. Henry
Attorney, Agent, or Firm—D. F. Straitiff

[57] ABSTRACT

Improved assembly for use in an inertially stabilized heliostat device, wherein the vertical stabilized-body-azimuth axis about which the elevation gimbal supporting the inertially stabilized body moves angularly in azimuth coincides with the vertical stabilizing-mirror-azimuth axis about which half-angle movement of the input stabilizing mirror takes place, both of these azimuth axes in turn lie in a plane that is common to that in which the horizontal elevation axis for such elevation gimbal lies, and the mass of the stabilized body lies both fore and aft of such elevation axis.

5 Claims, 6 Drawing Figures

INERTIALLY STABILIZED HELIOSTAT ASSEMBLY

BACKGROUND OF THE INVENTION

1. Field of the Invention

Inertially stabilized heliostat type devices.

2. Description of the Prior Art

Prior art heliostat devices of which applicant was aware had a vertical stabilized-body-azimuth axis about which an elevation gimbal supporting a highly concentrated inertially stabilized body was moveable angularly in azimuth; a vertical stabilizing-mirror-azimuth axis, offset horizontally from the stabilized-body-azimuth axis, about which a half-angle azimuth movement of an input stabilizing mirror took place; and a horizontal elevation axis on which such elevation gimbal was supported, which elevation axis was located in a vertical plane offset horizontally from the vertical plane in which the stabilized-body-azimuth axis was located.

As a result of the foregoing prior art arrangement, the entire weight of the inertially stabilized body was displaced aft of the elevation axis, and a balancing weight was employed on such gimbal forward of the elevation axis. The device was susceptible to an undesirable degree of performance degradation during subjection to certain vibrational conditions imposed on the device externally. Applicant rationalized that the counterweight of the prior art device so altered its resonant frequency as to make the device prone to adverse influence by the vibrational operating conditions, as well as adding unnecessarily to the overall weight of the device. In addition, applicant believed that the prior art counterweight on the elevation gimbal was improperly placed for best seismographic action (self-stabilization) of the device, and that added mass, if any, should be part of the inertia-stabilized body mass to enhance its inertial resistance to positional changes.

SUMMARY OF THE INVENTION

The present invention, in providing an improved assembly for an inertially stabilized heliostat device in which the stabilized-body-azimuth axis, the stabilizing-mirror-azimuth axis, and the elevation gimbal axis all lie in the same plane, at least substantially the same plane, and distributing the mass of the stabilized body both fore and aft of and in balance relative to the elevation axis, eliminates need for the elevation gimbal counterweight of the prior art, inasmuch as the vibrationally-induced vertical unbalance tendency of the prior art arrangement is thereby eliminated, and the overall weight of the device has been reduced significantly.

DESCRIPTION OF THE PREFERRED EMBODIMENT

Figure 1:
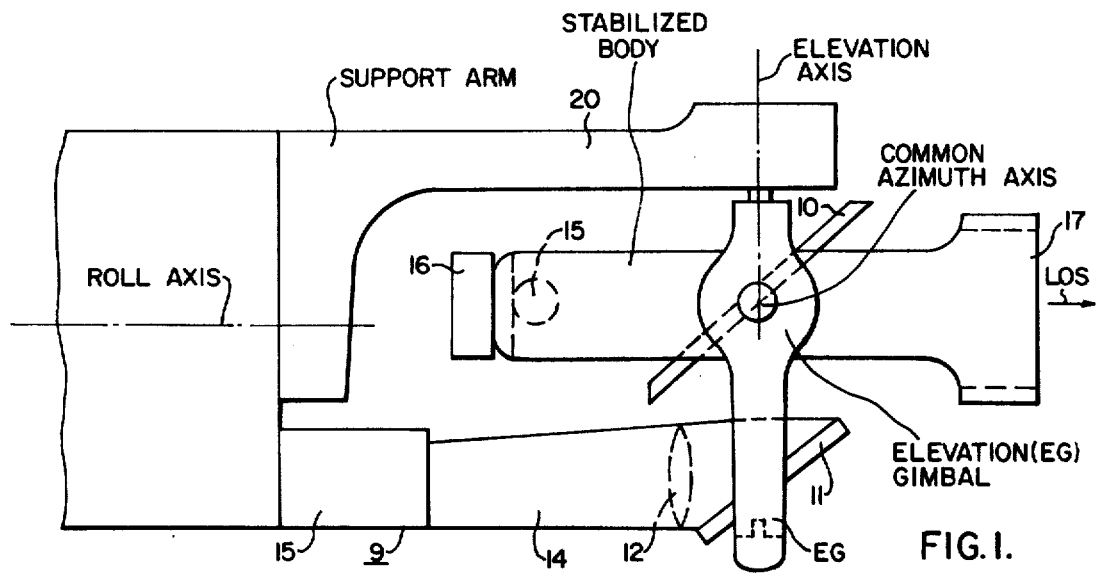
FIG. 1 is a top view of a schematic representation of an inertially stabilized heliostat device embodying the improved assembly of the present invention.

Referring to FIG. 1, a typical inertially stabilized heliostat device 9 is shown schematically, constructed in a manner suitable for use on such as an aircraft (not shown) for aiming a remote light source or spot, a concentrated image, or the like (not shown) located along a line of sight such as indicated by the arrow marked LOS, via a tilted planar input mirror 10 toward a fixed mirror 11 which in turn directs same via an objective lens 12, through a lens barrel 14 toward a sensor 15. The mirror 10 is disposed within a stabilized body SB provided with an elevation gyro 15 and an azimuth gyro 16 that operate when called upon to maintain a forward open end 17 of such body aimed toward a selected line of sight LOS by the inertial action of such gyros. The stabilized body SB is pivotally mounted on an elevation gimbal EG for relative angular movement along a vertical mirror azimuth axis. The elevation gimbal EG in turn is mounted on a support arm 20 for angular elevation movement about a horizontal elevation axis. The input mirror 10 is so arranged relative to the elevation axis that such axis passes centrally through the forward reflecting face of the mirror at an angle of about 45°, so that even though relative turning movement at such mirror about the elevation axis between the support arm 20 and the lens barrel 14, should occur as a result of a change in the elevation attitude of the vehicle, the face of the mirror 10 remains substantially in the same plane and undisturbed with respect to aiming a light input toward the fixed mirror 11. For changes in azimuth attitude of the support arm 20, lens barrel 14 and elevation gimbal EG the mirror azimuth axis permits such relative azimuth attitude change to transpire while the stabilized body SB remains pointed toward the line of sight LOS, and the input mirror 10 is arranged to move in azimuth about its mirror azimuth axis one-half as much as the relative angular azimuth movement between the stabilized body SB and the elevation gimbal EG, as will be explained in detail hereinafter. By virtue of this latter arrangement the input light information reaching input mirror is automatically maintained directed toward the fixed mirror 11 in the presence of azimuth attitude changes in the elevation gimbal EG.

Figure 2:
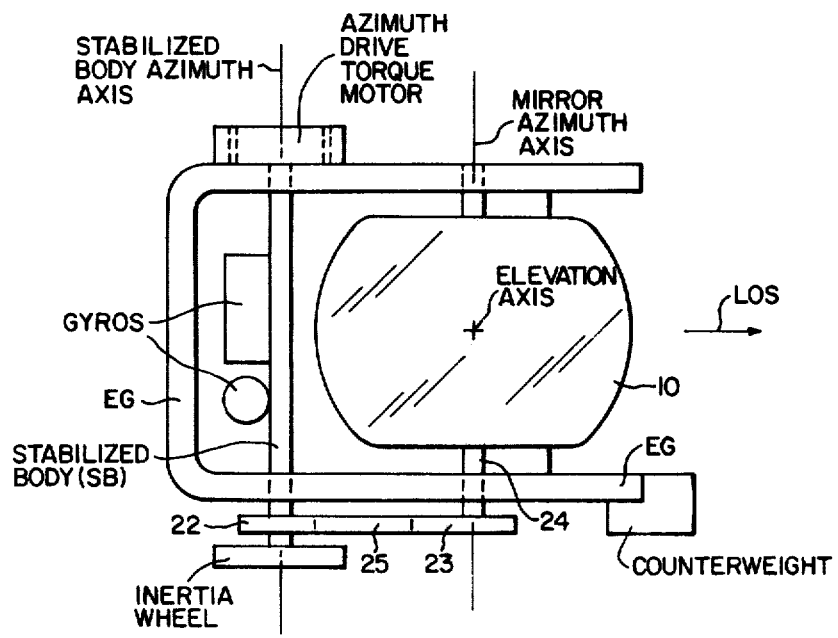
FIG. 2 is a side view of a schematic representation of the prior art arrangement of elevation gimbal, stabilized body, and stabilizing mirror assembly as employed in a heliostat device of the general type shown in FIG. 1.

As previously described briefly herein, the prior art arrangement providing for azimuth-change control of the input mirror 10, FIG. 2 included an inertially stabilized body SB in the form of a vertically oriented shaft arranged for angular azimuth movement about a stabilized body azimuth axis relative to a C-shaped elevation gimbal EG disposed in a vertical plane. The input mirror 10 was arranged for half-angle movement about a vertical mirror azimuth axis that was offset horizontally from the stabilized body azimuth axis and was located in the same plane as the elevation axis about which the elevation gimbal is angularly moveable. The half-angle drive arrangement includes a small pulley 22 that turns with the stabilized body SB and a large pulley 23 secured to a shaft 24 connected to the mirror 10. The large pulley 23 is turned in the same direction as the small pulley 22, but to one-half the extent by a belt 25 passing around and anchored to the two pulleys. The previously mentioned counterweight is shown attached to the lower forward end of the elevation gimbal EG to balance the weight of the stabilizing body SB and affiliated components including, gyros, and inertia wheel and an azimuth drive torque motor, which operates to power assist the relative turning between the stabilized body SB and the elevation gimbal EG against friction of the rotary joints therebetween.

Figure 3:
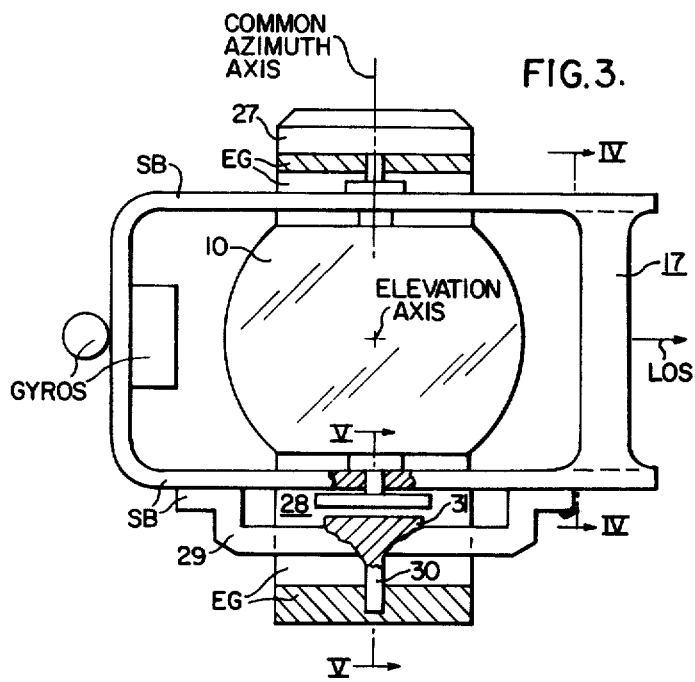
FIG. 3 is a similar view of such assembly of components as constructed, arranged, and operated in accord with the improvements of the present invention.
Figure 4:
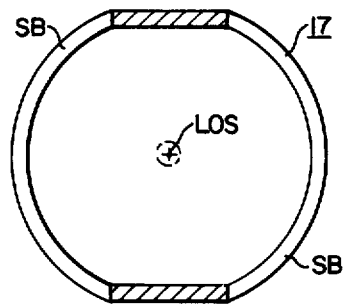
FIG. 4 is an exemplified showing of a portion of the stabilized body included in the FIGS. 1 and 3 showings, FIG. 4 being taken along the line IV-IV in FIG. 3.
Figure 5:
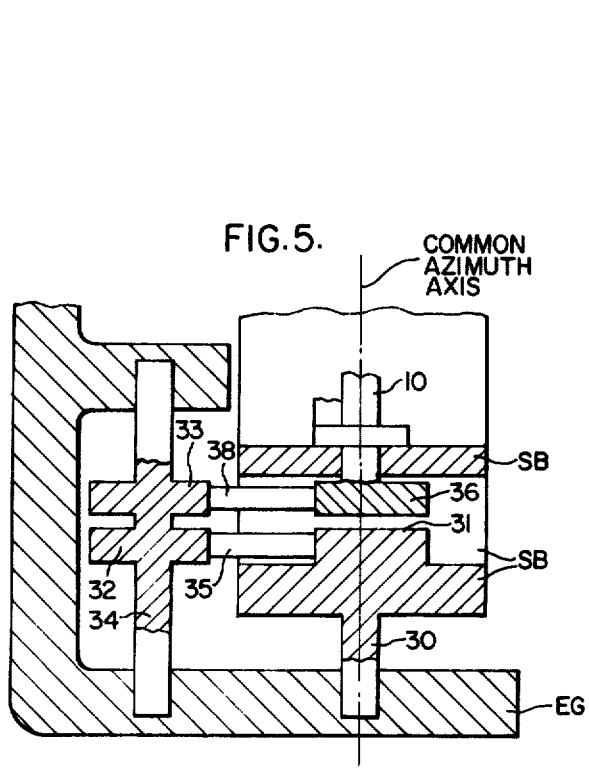
FIG. 5 is a simplified schematic side view of a half-angle drive arrangement for the stabilizing mirror, as suitable for embodiment in the improved assembly of the present invention as shown in FIG. 3; and, FIG. 6 is a simplified representation in top view of the kinematic components and relationships embodied in the half-angle drive arrangement shown in various elevation views in FIGS. 3 and 5.
Figure 6:
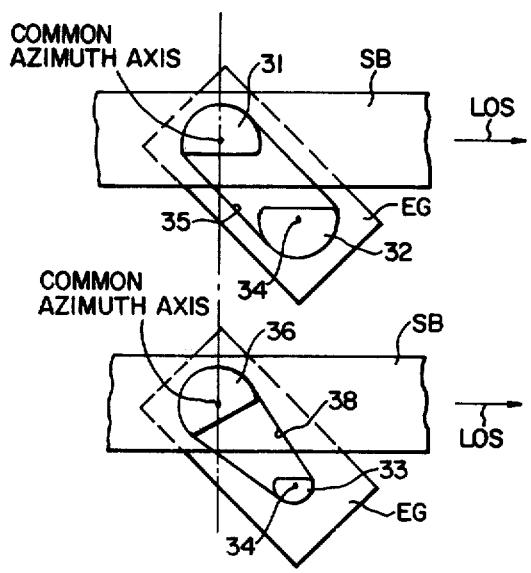

Referring to FIG. 1 and to FIG. 3, the improvements of the present invention as previously discussed include a generally U-shaped elongated stabilization body SB extending horizontally and pivotally connected about midway between its opposite ends to an elevation gimbal EG for angular elevation movement about a horizontal elevation axis passing centrally through the planar input mirror 10 at an angle of about 45° with respect thereto. The rearward end of the stabilization body SB carries, on a vertical leg thereof, the azimuth and elevation gyros that operate to hold the forward open end 17 of the SB aimed along the intended line of sight LOS in the presence of relative angular azimuth movement of the elevation gimbal extending transversely across the top, bottom, and sides of such body SB. In accord with the invention, the vertical azimuth axis for the stabilization body SG is in common with the azimuth axis for the mirror 10, with an azimuth torque motor 27 at the uppermost end of the axis and a half-angle drive mechanism 28 at the bottom. Referring particularly to FIG. 3, the stabilized body SB is pivotally supported at its bottom by way of a downwardly extending member 29 having a shaft portion 30 beneath journaled in a horizontal portion of the elevation gimbal EG and a drive pulley 31 projecting upwardly in alignment with the common azimuth axis. Referring to FIGS. 3, 5, and 6, in addition to the pulley 31 attached integrally to the stabilized body SB, the half-angle drive mechanism includes a pair of vertically offset pulleys 32 and 33 mounted on a common shaft 34 which is offset horizontally from the common azimuth axis and the pulleys are turned via a flexible metal belt or strap 35 the same degree of angular azimuth movement as that which may transpire between the stabilizing body SB and the elevation gimbal EG. The upper pulley 33, while turning the same degree as that of the lower pulley, effects turning of a larger diameter output pulley 36 attached to the mirror 10 via a belt 38 to obtain angular azimuth movement of the mirror 10 to one-half the extent of any angular aximuth movement between the elevation gimbal EG and the stabilized body SB, as evidenced by the showing in FIG. 6.

I claim:

1. An assembly for an inertially stabilized heliostat device, comprising, an elevation gimbal having a horizontal elevation axis about which such gimbal is pivotally moveable in elevation angulation attitude, an inertially stabilized body pivotally affiliated with said elevation gimbal for relative angular azimuth movement about a vertical stabilized-body-azimuth axis located in substantially the same plane as that of said elevation axis, an input mirror pivotally affiliated with said inertially stabilized body for relative angular azimuth movement about a vertical mirror-azimuth axis substantially aligned with said stabilized-body-azimuth axis, and, a half-angle drive means responsive to relative turning movement between said elevation gimbal and said stabilized body about said stabilized-body-azimuth axis to effect turning of said mirror about said mirror-azimuth axis in the same direction as the elevation gimbal azimuth movement but to one-half the angular extent.

2. The assembly of claim 1, wherein said inertially stabilized body extends horizontally forwardly and rearwardly of said elevation axis in balance at opposite sides thereof.

3. The assembly of claim 2, wherein the rearward end of said stabilized body includes gyro means and the forward end of such body is open for pointing along a line of sight to admit light information to said input mirror.

4. The assembly of claim 3, wherein a forward planar reflective surface of said mirror is tilted relative to said line of sight and said elevation axis extends at right angles thereto in intersection with a central region of said planar reflective surface.

5. The assembly of claim 1, wherein said half-angle drive means includes two pairs of vertically-offset belt-coupled pulleys arranged for turning about horizontally offset vertical axes.

* * * * *